July 29, 1941.　　　　　G. NEUHAUS　　　　　2,251,155
COMPUTING DEVICE
Original Filed Feb. 23, 1937　　2 Sheets-Sheet 1
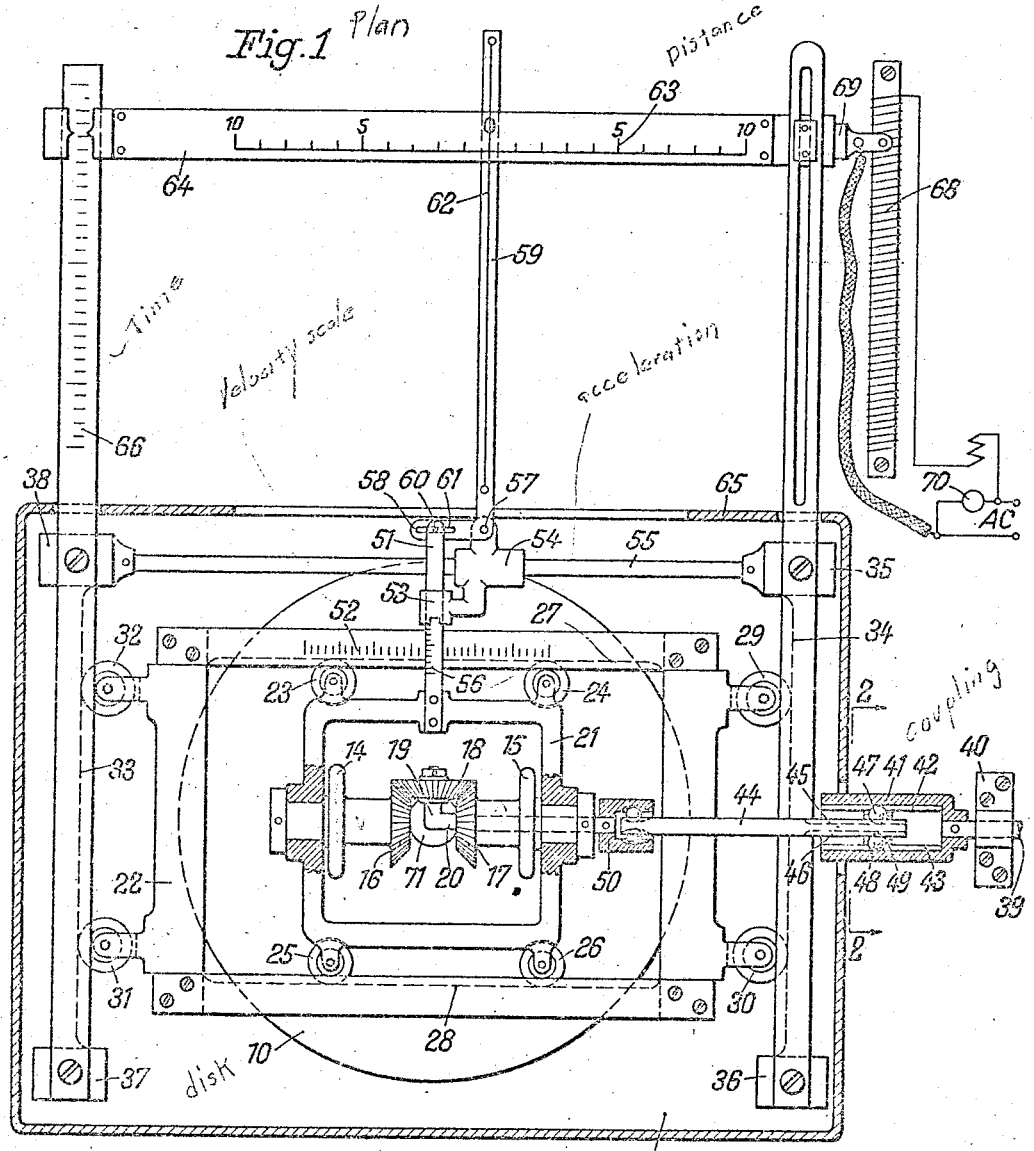
Fig. 1 Plan
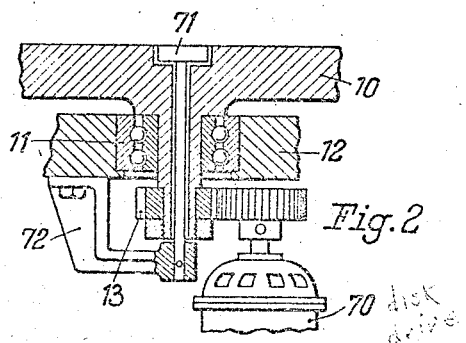
Fig. 2
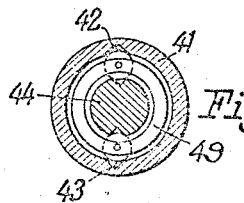
Fig. 3
Inventor:
Gustav Neuhaus

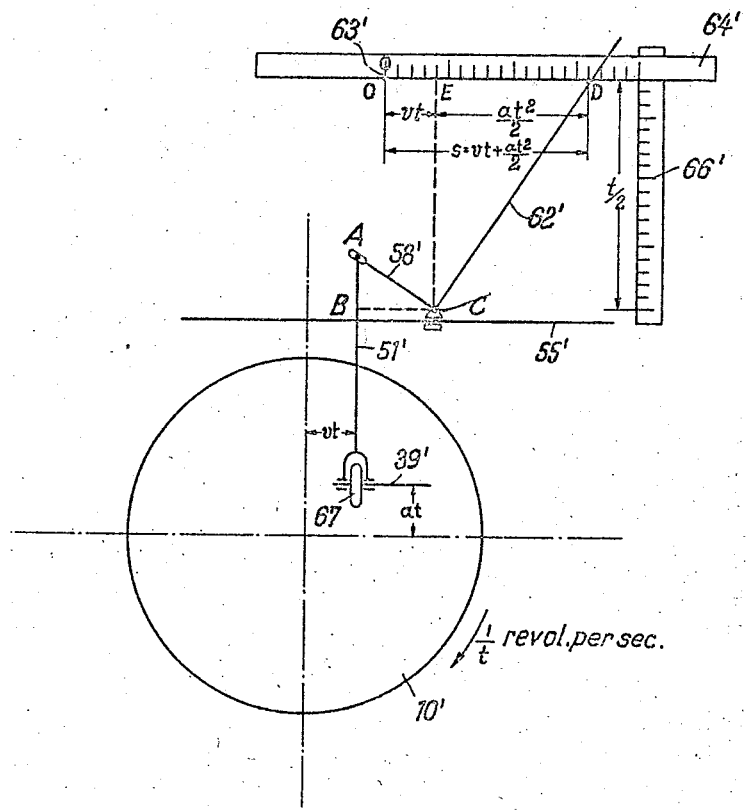

Patented July 29, 1941

2,251,155

UNITED STATES PATENT OFFICE 2,251,155

COMPUTING DEVICE

Gustav Neuhaus, Essen-Stadtwald, Germany, assignor to Askania-Werke A. G., a corporation of Germany Original application February 23, 1937, Serial No. 127,235. Divided and this application March 2, 1938, Serial No. 193,593. In Germany May 25, 1935

3 Claims. (Cl. 235—61)

This invention relates to computing devices, more particularly to devices for analysing motions for the purpose of determining the magnitude of the velocity and of the acceleration of a moving object.

This application is a division of my copending application Ser. No. 127,235, filed February 23, 1937, and entitled "Improvements in friction gears."

Aims, objects, and advantages of this invention will appear from a consideration of the description which follows with the accompanying drawings showing embodiments of this invention for illustrative purposes. It is to be understood, however, that the description is not to be taken in a limiting sense, the scope of this invention being defined in the appended claims.

Referring to the drawings:

Fig. 1 is a plan view of a friction gear, more particularly for analysing accelerated motions.

Fig. 2 is a sectional elevation of the center part of the disk of the gear shown in Fig. 1.

Fig. 3 is a cross section of a shaft coupling of the gear mechanism of Fig. 1, the section being taken on line 2—2.

Fig. 4 is a diagrammatic illustration of the principle underlying the operation of the invention.

A disk 10 (Figs. 1 and 2) supported in bearings 11 by a table 12 is rotatable by suitable means, such as a synchronous or variable speed motor, depending on the particular purpose for which the friction gear is to be used, as will be hereinafter explained. For connection with the motor, not shown in these drawings, a gear 13 is shown as secured to the hub of the disk.

Two friction wheels 14 and 15 are arranged to be in contact with the driving surface of the disk 10 to be driven thereby. It appears that the friction wheels arranged to engage the disk on opposite sides of a disk diameter will rotate in opposite direction. Means for transmitting the differential rotary motion of the friction wheels are shown in the form of a differential gear train, comprising bevel-gears 16 and 17 secured to, or integral with, the friction wheels 14 and 15, and a further bevel-gear 18 rotatable on the angled end 19 of a shaft 20.

The friction wheels are mounted for displacement in the direction of their axis of rotation and a direction perpendicular thereto in a support. The support is shown as comprising a wheel bearing member or inner frame 21 and an outer member or frame 22. The inner frame 21 is provided with rollers 23, 24, 25, and 26 running in preferably V-shaped tracks 27 and 28 of the outer frame. The outer frame, in turn, has rollers 29, 30, 31, and 32 running in tracks 33 and 34 which at right angles to the first named tracks are supported at points 35, 36, 37, and 38 fixed relatively to the axis of rotation of the disk 10.

For connection of the shaft 20 with a second shaft 39 rotatable in a fixed bearing 40 a shaft coupling is provided permitting axial and lateral movements of the two shafts relatively to each other. The shaft coupling, a cross section of which is shown in Fig. 3, is shown as comprising a hollow cylinder 41 secured to one shaft and having two preferably V-shaped longitudinal recesses 42 and 43 at the inside. An intermediate shaft 44 is provided with similar recesses 45 and 46 and connected to the cylinder by balls 47 and 48 guided in a cage 49. The other end of the intermediate shaft 44 may be connected in a similar way to a hollow cylinder 50 secured to the shaft 20.

The operation of the device, so far described, is as follows:

Assuming the disk be driven at a uniform speed, it is clear that the shaft 20 will be rotated at a rate which is proportional to the axial displacement of the friction wheels from the center of the disk. In the position shown in Fig. 1 the speed of the shaft 20 will be zero. If the friction wheels are displaced perpendicularly to the direction of their axis of rotation the shaft 20 will be rotated at an increasing rate while the friction wheels run automatically without slipping or sliding towards the center or the edge of the disk, as the case may be. The rate of change of rate of rotation of the shaft 20 is the greater the greater the perpendicular displacement. It may therefore be stated that the acceleration of the shaft is a function of the normal displacement.

Reversing the process it may now be assumed that the shaft 39, 44, 20 be driven at an unknown rate and acceleration which are desired to be determined or analysed. This may easily be accomplished due to the fact that the friction wheels in case they are freely movable on the disc will automatically assume a position on the disk which corresponds to the present rate and rate of change of rate of the rotary motion of the shafts. The magnitude of the respective velocity and acceleration may be determined by measuring the respective displacements by suitable means as will also be hereinafter described.

It is further possible to modify the motion of the shaft 20, respectively the displacement values of the friction wheels by imparting to the disk 10 a non-uniform speed, e. g. by driving it by a variable speed motor.

Indicating means may be provided for indicating the axial and perpendicular displacements of the friction wheels. Such means are shown in Fig. 1 as being a bar 51 movable with the inner frame 21. The axial displacement representing the velocity value may be read at a scale 52 on the track bar 27 and associated with the left edge of the bar 51.

The bar 51 is guided in an arm 53 of a guide block 54, slidable on a stationary bar 55, thereby carrying the guide block and the inner frame with it. Upon perpendicular displacement of the friction wheels and the inner frame the bar 51 will move relatively to the arm 53. A scale 56 on the bar 51 and associated with a pointer or reading mark on the arm will therefore permit reading of the perpendicular displacement representing the acceleration value.

The velocity and acceleration values may be used for computing the distance of travel in a certain time of a certain object the movement of which is analysed in the friction gear. For this purpose any suitable computing device may be used. A particularly simple form is shown in Fig. 1.

On the guide block there is pivotally mounted at 57 a crank shaped lever having two arms 58 and 59. A pin 60 on the bar 51 engages a slot 61 of the one arm 58 of the lever, while the other arm 59 is equipped with a pointer, shown as being a wire 62 moving over a scale 63 on a scale bar 64. The scale bar 64 is vertically adjustable on the elongations of the track bars 33 and 34 protruding from a casing 65 in which the gear may be inclosed. A further scale 66 is provided for setting the postiion of the scale bar 64. The scale 63 is graduated in terms of distance while the scale 66 is graduated in terms of time.

For understanding the operation of the gear and computing mechanism it is well to remember that the distance $s$ of an object moving at a rate $v$ with an acceleration $a$ for a time $t$ may be expressed as $$s = vt + \frac{at^2}{2}$$

A motion proportional to the motion of the object may be derived from the motion of a sighting device aimed at the object and may be introduced into the friction gear by the shaft 39. The friction wheels will accordingly, as hereinbefore explained, assume a position on the disk indicative of the momentary velocity and acceleration of the movement. Assuming the distance of travel of the object has to be determined during a definite time $t$, the scale bar 64 is set according to the value $$\frac{t}{2}$$

readable on the scale 66 before shaft 39 begins to rotate and the disk 10 rotated at a rate of $$\frac{1}{t}$$

revolutions per time unit. The desired distance value will then appear directly to be read on the scale 63 indicated by the pointer 62.

The operation of the mechanism will be readily understood by having reference to the diagrammatic Figure 4. Primed reference numerals are applied to this figure in which for reasons of simplicity the two friction wheels and differential gear are shown as a single wheel 67 rotating with the shaft 39'.

It was hereinbefore pointed out that the axial displacement of the friction wheel 67 is proportional to its velocity, and the perpendicular displacement proportional to the acceleration of its rotary motion. The velocity and acceleration values are now multiplied by the time value by imparting to the disk 10' a rotary motion which is inversely proportional to the time, thereby obtaining as $vt$—and $at$—values the actual axial and perpendicular displacements of the friction wheel. The friction wheel, having a rotary motion proportional to that of the object will naturally be displaced the greater a distance from the zero line, indicated as dash-dot lines in Fig. 4, the slower the disk revolves, i. e. the greater the time of motion $t$ of the object, thereby increasing the deflection of the distance indicating member 62'.

The $vt$ value, the distance of the bar 51' from the zero line, appears again as displacement of the pivot point E along the bar 55 and as distance O—E on the scale 63'.

The $$\frac{at^2}{2}$$

value is obtained as follows. It appears that the triangles ABC and DEC are similar triangles, being right angled at B and E and having equal angles ACB and DCE. It appears therefrom, the side A—B being equal to $at$, that the side D—E is equal to $$\frac{at^2}{2} \times BC$$

the bar 64' being displaced by $$\frac{t}{2}$$

relatively to the scale 66'. The latter scale may conveniently be graduated to read $$\frac{t}{2}$$

values. The total distance covered by the object travelling at a velocity of $v$ and an acceleration of $a$ for a time $t$ appears therefore as the distance O—D readable on the scale 63'.

An automatic device may be provided for controlling the speed of the disk in inverse proportion to the time set at the scale 66. For this purpose there is shown in the drawings a variable resistance 68 having a sliding contact 69 operated by the scale bar 64. The resistance lies in series with the field of a shuntwound motor 70 connected to drive the disk. By setting greater time values by raising the bar 64, the field of the motor is strengthened and the speed of the motor accordingly decreased.

It is a disadvantage with friction gears having only one friction wheel that for positions of the friction wheel very close to the center of the disk, the wheel has the tendency of slipping, thereby introducing an uncontrollable error, especially disadvantageous, if the device is used for computing purposes.

To overcome this disadvantage two friction wheels are provided which constitute a differential drive. For even very slight displacements of the inner frame 21 from the zero position, in which the friction wheels are equidistant from the center of the disk, there will be no slipping of the wheels and correspondingly a correct position is obtained.

For large displacements which occasionally occur there is the disadvantage that one friction wheel may get so close to the center that an uncontrollable error is introduced. To overcome this disadvantage a stationary center part 71 shown as secured to the table 12 by means of a bracket 72 (Fig. 2) is provided.

A constant and determinable error will arise, when a friction wheel is moved onto the center part. This error, however, may easily be compensated for by a corresponding alteration of the respective section of the scale graduation.

Obviously, the present invention is not restricted to the particular embodiments herein shown and described. Moreover, it is not indispensable that all the features of this invention be used conjointly, since they may be employed advantageously in various combinations and subcombinations.

What is claimed is:

1. The combination of a disk mounted for rotation about an axis, a friction wheel adapted to be rotated proportionally to a motion to be analyzed; means for mounting said friction wheel for rotation in frictional engagement with the surface of said disk, for displacement in a direction parallel to the wheel's axis of rotation, and for displacement in a direction perpendicular thereto; means connected to rotate said disk; a pointer; a support pivotally supporting said pointer; means for mounting said support for movement in a direction parallel to the friction wheel's axis of rotation; means for deflecting said pointer in response to the perpendicular displacements of said wheel; means for displacing said pointer support in response to axial displacements of said wheel; and scale means associated with said pointer.

2. The combination of a disk mounted for rotation about an axis; a friction wheel adapted to be rotated proportionally to a motion to be analyzed; means for mounting said friction wheel for rotation in frictional engagement with the surface of said disk, for displacement in a direction parallel to the wheel's axis of rotation, and for displacement in a direction perpendicular thereto; means for rotating said disk at a rate which is inversely proportional to a given time; a pointer; a support pivotally supporting said pointer; means for mounting said support for movement in a direction parallel to the friction wheel's axis of rotation; means for deflecting said pointer in response to the perpendicular displacements of said wheel; means for displacing said pointer support in response to axial displacements of said wheel; scale means associated with said pointer; and means for mounting said scale for displacement parallel to itself.

3. The combination of a disk mounted for rotation about an axis; a friction wheel adapted to be rotated proportionally to a motion to be analyzed; means for mounting said friction wheel for rotation in frictional engagement with the surface of said disk, for displacement in a direction parallel to the wheel's axis of rotation, and for displacement in a direction perpendicular thereto; means connected to rotate said disk; a pointer; a support pivotally supporting said pointer; means for mounting said support for movement in a direction parallel to the friction wheel's axis of rotation; means for deflecting said pointer in response to the perpendicular displacements of said wheel; means for displacing said pointer support in response to axial displacements of said wheel; scale means associated with said pointer; means for mounting said scale for displacement parallel to itself; and means for controlling the rate of said prime mover in response to the parallel displacements of said scale.

GUSTAV NEUHAUS.